Jan. 5, 1960     E. J. KIMM     2,919,943
MAGNETIC SEALING MEANS
Original Filed June 2, 1958
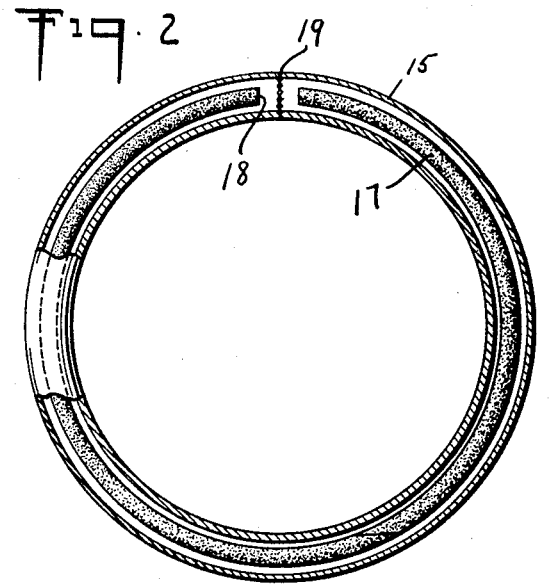
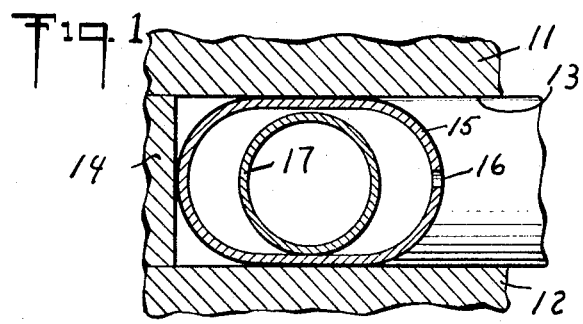
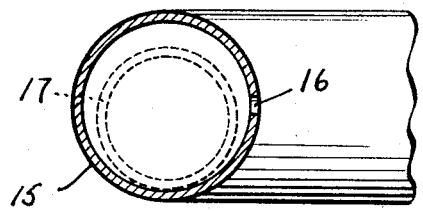
Inventor
Ewald J. Kimm
By    J E Beringer
His Attorney

United States Patent Office 2,919,943
Patented Jan. 5, 1960

2,919,943

MAGNETIC SEALING MEANS

Ewald J. Kimm, Dayton, Ohio, assignor to United Aircraft Products, Inc., Dayton, Ohio, a corporation of Ohio Original application June 2, 1958, Serial No. 739,225. Divided and this application September 11, 1958, Serial No. 760,380

5 Claims. (Cl. 288—20)

This invention relates to sealing rings and to sealed joints, and particularly to hollow metallic sealing rings. This is a division of application S.N. 739,225, filed June 2, 1958, for Sealing Means by Edward L. Ladd and Ewald J. Kimm.

More specifically, the invention is concerned with hollow metallic O-rings of a kind installed in a groove or recess in use for a predetermined compression loading, the ring being made of thin compressible tubing or the like.

An object of the invention is to make a sealing ring as described magnetic for simplified installation and removal under remote control.

Other objects and structural details of the invention will more clearly appear from the following description when read in connection with the accompanying drawing, wherein:

Fig. 1 is a detail enlarged view, showing in cross-section a sealing ring and contained magnetic means therein in an installed position;

Fig. 2 is a top plane view, partly broken away, showing a ring as illustrated in Fig. 1; and Fig. 3 is a detail view of a section of the sealing ring prior to installation thereof.

Referring to Fig. 1, in the illustrative installation of the sealing ring, a sealed joint has a pair of opposing plates 11 and 12 defining between them a chamber 13 to which fluid under pressure may be admitted. At the peripheries of the plates 11 and 12 is a spacing member 14. Suitable bolts extending through the peripheries of the plates and through the spacer 14 may be used to hold the parts in assembled relation. An O-ring 15 is installed between the plates 11 and 12, with the spacer 14 providing a lateral back-up therefor. The O-ring may have initially a circular shape as shown in Fig. 3, and, when installed in the recess defined by the spacer 14 and one of the plates 11 and 12, projects out of such recess. Upon application of the other plate into superposed relation to such recess, however, and tightening down of the bolts, opposing surfaces of the O-ring are engaged and caused to approach one another, the O-ring being thereby compressed to an out-of-round configuration, substantially as indicated in Fig. 1. The O-ring has a resilient construction, being made of a thin metal tubing or the like and so resists compression with an equal force applied against opposing surfaces of the respective plates 11 and 12. As a result these surfaces are sealed and fluid pressure in the chamber 13 is inhibited thereby from escaping outwardly through the peripheral joint interconnecting the plates. The O-ring may be provided with one or more small diameter openings 16 which serve a purpose in self-energizing the ring whereby it is permitted to respond to separating motions of the plates 11 and 12, pressure or temperature induced, with a natural resilience substantially uninhibited by pressures under control. The amount of initial compression loading of the ring may be limited by interengagement of the plates and spacer members, or such loading may be selected by the application of predetermined torque forces upon the bolts. The exterior of the ring 15 may be coated with a plastic material for more effective sealing against gases.

The invention is concerned with means by which a hollow sealing ring as described is made magnetic to facilitate installation and removal of the ring by remote control, using magnets, when this may be desirable, for example in areas where on account of radiation the ring installation cannot be approached and directly handled.

According to the illustrative example of the invention, the ring 15, which may or may not be coated on its exterior is made of a flexible, non-magnetic metallic tubing. In an installed condition, the ring may appear as shown in Fig. 1 wherein it is compressed by opposing plates 11 and 12 and held by back-up ring 14. Within the sealing ring, in accordance with this concept of the invention, is an interior ring 17 made of a suitable metal to be subject to magnetic attraction applied from outside the sealing ring. While magnetic means may be provided in the sealing ring in various forms, in the illustrated instance it takes the form of a circular, hollow, compressible ring smaller in its outside diameter than the inside diameter of the sealing ring. The diameter of the interior ring may, in this connection, be predetermined to avoid limiting the compression of the sealing ring by the walls 11 and 12, although since the interior ring is itself constructed for compression it may yield in response to pressure applied by the sealing ring to accommodate the application of the necessary compression load to the sealing ring.

The interior magnetic ring 17 is movable within the sealing ring. It is capable of self-adjustment therein in a manner to obviate interference with compression of the sealing ring and also to avoid interference with a free communication between the interior and the exterior of the sealing ring through the openings 16. The ends of the interior ring are split at 18, as indicated in Fig. 2. In the manufacture of the ring, the free ends of the tubing of which the sealing ring 15 essentially is comprised, are joined in a weld 19. Prior to welding, the interior ring 17 is inserted into the internal chamber of the sealing ring and there positioned so that its free ends lie on opposite sides of the weld joint, or within the corresponding free ends of the sealing ring. Accordingly, damage to the magnetic interior ring at the time of making the weld 19 is avoided.

The invention has especial application to installations dealing with corrosive fluids. The outer or sealing ring proper is under these circumstances made of a corrosion resistant metal and may be non-magnetic. Through use of the interior magnetic ring, however, the sealing ring as a whole may be made responsive to magnetic forces. If it is desired to avoid contact of the interior ring with the fluids under control the self energizing openings 16 are omitted.

What is claimed is:

1. A hollow sealing ring defining internally thereof a closed chamber, a plastic material coating the exterior of the ring, said ring having at least one opening for self-energizing of the ring extending through both the base ring and the coating thereon, and magnetic means disposed in said chamber to make said ring subject to magnetic attraction, said means having a cross-sectional dimension less than the cross-sectional dimension of said chamber to permit compression of the ring under load and to obviate interference with free communication between the interior and exterior of the ring through said opening.

2. A hollow sealing ring adapted under load to yield in an approaching motion of one wall surface toward an opposite wall surface, said ring defining an internal chamber of uniform cross-section, and an interior ring disposed in said chamber for motion relative to the sealing ring, said interior ring being made of magnetic material and constructed in a hollow metallic form compressible by the approaching wall surfaces of the sealing ring.

3. A hollow sealing ring adapted under load to yield in an approaching motion of one wall surface toward an opposite surface, comprising a length of relatively thin tubing formed from metal of uniform thickness and having its ends joined together to define an O-shaped ring, said ring defining an internal chamber of uniform cross-section, and an interior ring disposed in said chamber for a motion relative to the sealing ring, said interior ring being made of magnetic material and having ends spaced apart on opposite sides of the joint between the ends of the tubing defining the sealing ring.

4. A hollow sealing ring according to claim 3, characterized in that said interior ring is constructed in a hollow metallic form compressible by the approaching wall surfaces of the sealing ring.

5. A continuous hollow sealing ring made of nonmagnetic material and defining internally thereof a closed chamber of uniform cross-section, the wall of said ring being made thin for flexing under load, and an interior ring freely disposed in said sealing ring for relative motion, said interior ring being of less cross-sectional area than said closed chamber so as not to hamper flexure of said sealing ring and being made of magnetic material.

References Cited in the file of this patent

UNITED STATES PATENTS

| 241,126 | Drake | May 10, 1881 |
| 2,471,635 | Mark et al. | May 31, 1949 |
| 2,806,396 | Miller | Sept. 17, 1957 |
| 2,814,517 | Razdow | Nov. 26, 1957 |
| 2,837,360 | Ladd | June 3, 1958 |

FOREIGN PATENTS

| 247,119 | Great Britain | Feb. 11, 1926 |